United States Patent [19]

Macleod et al.

[11] 4,314,958

[45] Feb. 9, 1982

[54] PLASTIC PIPE EXTRUSION

[75] Inventors: Kenneth S. Macleod; Gary Fink, both of Calgary, Canada

[73] Assignee: Phillips Petroleum Company, Bartlesville, Okla.

[21] Appl. No.: 171,219

[22] Filed: Jul. 22, 1980

[51] Int. Cl.³ .................. B29D 23/04; B29F 3/08
[52] U.S. Cl. .................... 264/167; 264/178 R; 264/209.4; 264/237; 264/342 RE; 425/325; 425/379 R; 425/380; 425/393; 425/465; 425/467
[58] Field of Search .......... 264/209, 565, 566, 237, 264/178 R, 167, 342 RE, 209.1, 209.3, 209.4–209.5, 209.8; 425/378 R, 379, 465, 380–381, 467, 325, 392, 393

[56] References Cited

U.S. PATENT DOCUMENTS

| | | | |
|---|---|---|---|
| 2,708,772 | 5/1955 | Moncrieff | 264/209 |
| 3,057,013 | 10/1962 | Loveless | 264/178 R |
| 3,184,792 | 5/1965 | Commisso | 425/380 |
| 3,249,671 | 5/1966 | Perrone | 264/209 |
| 3,295,166 | 1/1967 | Owings | 425/380 |
| 3,320,637 | 5/1967 | Van Dijk | 425/378 R |
| 3,393,427 | 7/1968 | Larsen | 425/379 |
| 3,472,923 | 10/1969 | Gerrard | 264/209 |
| 3,728,424 | 4/1973 | Bauer | 264/178 R |
| 3,752,630 | 8/1973 | Takagi et al. | 425/392 |
| 3,963,403 | 6/1976 | Hughes et al. | 425/325 |
| 4,137,028 | 1/1979 | Reitemeyer et al. | 425/141 |

Primary Examiner—Jeffery R. Thurlow

[57] ABSTRACT

By expanding a plastic pipe while it is still hot and expandable and thereafter shrinking the so-expanded pipe to a defined point of shrinkage where the pipe is cooled, e.g., by a water spray, it is possible to produce pipes of any diameter within a range using only one extruder die orifice. The expansion and shrinking is carried out using a double cone external mandrel. The process of the invention has the advantage of allowing the production of plastic pipe of any diameter specified by a customer without having to change the die orifice of the extruder.

11 Claims, 1 Drawing Figure

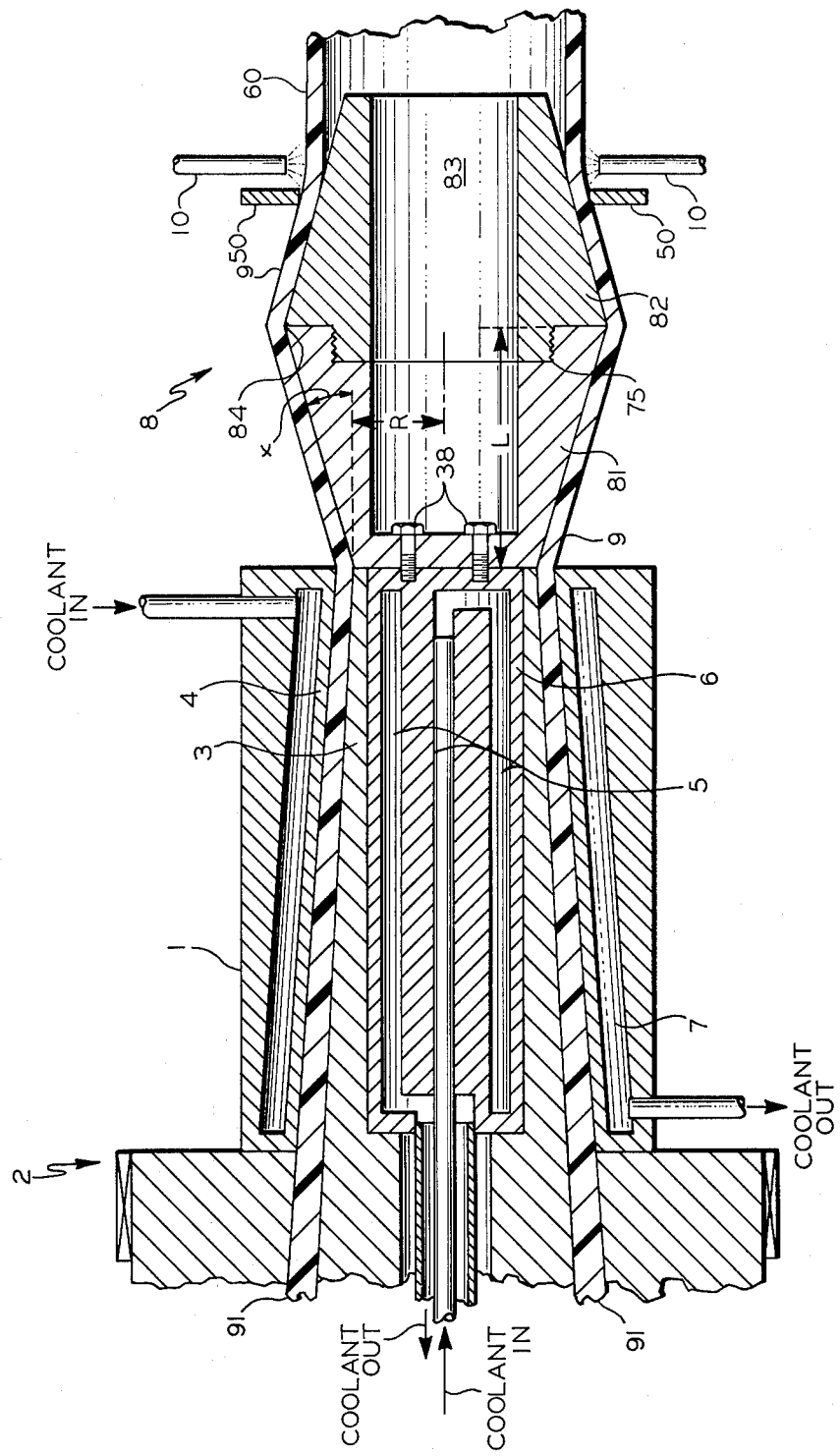

PLASTIC PIPE EXTRUSION

This invention relates to the extrusion of plastic pipe allowing the production of plastic pipes with different external diameters without changing the die orifice. The invention also relates to an apparatus for carrying out that process. Furthermore, the invention relates to a metal element that can be used in connection with an extruder to produce pipe of preselected diameter.

BACKGROUND OF THE INVENTION

The use of plastic pipe has significantly increased in recent years. Normally, plastic pipe is produced by extruding molten plastic through a die orifice of an extruder. In order to change the diameter of the plastic pipe, it is usually necessary to change the die orifice of the extruder. This operation is labor intensive and requires to shut down the extruder. Furthermore, the process has the disadvantage of allowing only the production of pipe having discrete diameters such as 1", 2", 4", etc., but does not readily permit the production of pipe having any outside diameter specified by the customer.

Thus, it would be highly desirable to have a process available which allows the use of one die and, yet, permit the production of pipe having a plurality of diameters. Furthermore, it would be desirable to have such a process which allows the manufacture of plastic pipe having a diameter given by the customer.

THE INVENTION

It is, thus, one object of this invention to provide a process for the extrusion of plastic pipe or tubing that is readily adaptable to different pipe diameters.

Another object of this invention is to provide a process for the extrusion of plastic pipe or tubing permitting the choice of any diameter within a range of diameters without having to change the die orifice of the extruder.

Still another object of this invention is to provide an apparatus for carrying out the process.

A yet more specific object of this invention is the provision of a metal element that allows the production of plastic pipe of preselected diameter in connection with a regular pipe extruder.

These and other objects, advantages, details, features, and embodiments of this invention will become apparent to those skilled in the art from the following detailed description of the invention, the appended claims, and drawing, which shows a schematic cross-sectional view of the apparatus of this invention.

In accordance with this invention, it has been found that it is possible to produce plastic pipe or tubing in an extrusion process using one and the same die and still manufacture plastic pipe in a broad range of external diameters. In accordance with this invention, the pipe extruded is expanded while it is still hot and deformable and is, thereafter, allowed to shrink while it is still hot and deformable; then, the plastic pipe is cooled at a preselected location to freeze and stop the shrinkage and thereby to produce a plastic pipe of preselected external diameter. By changing the location of this preferably rapid cooling, the external diameter of the pipe can be changed.

In one embodiment of the invention, this process is carried out by guiding the extruded plastic pipe while it is still hot and while it is still in a pliable or deformable state in which the material, after a mechanical deformation, shrinks back toward the original shape if allowed to do so is guided over an external expanding mandrel. This mandrel will be described in some more detail in connection with the apparatus embodiments of this invention. The thus-expanded plastic pipe is thereafter allowed to shrink to a certain extent which is predetermined and which defines the ultimate external diameter of this pipe. The plastic pipe during the expansion and shrinking is in a semi-molten state. To stop further shrinkage, the pipe is cooled at a preselected axial location within a range of axial cooling positions. The respective axial cooling positions correspond to a range of external diameters of the pipe.

In order to change the external diameter of the pipe in accordance with this invention, it is generally not necessary to change either the mandrel or the bushing which forms the orifice of an extruder. Rather, it is possible and constitutes a further embodiment of the process of this invention to cool the shrinking but still hot and pliable or deformable pipe at a first location for a first period of time such as to produce a first quantity of pipe having a first diameter and thereafter changing this cooling location and cooling the plastic pipe for a second period of time at a second location to obtain a plastic pipe having a second diameter. When the second cooling location is chosen to be upstream of the first cooling location with respect to the pipe movement, the second diameter of the pipe produced is larger than the first diameter. Correspondingly, a cooling location located downstream of the first cooling will produce a pipe having a smaller diameter than the pipe produced by cooling at the first cooling location.

Whereas the plastic material used in this process can vary in composition, it is presently preferred to use polyethylene or copolymers of ethylene and a minor quantity of mono-olefin comonomers having four to eight carbon atoms. The most preferred thermoplastic material contemplated for the process of this invention is a high molecular weight polyethylene or ethylene copolymer.

The plastic pipe leaving the extruder and being expanded is in a state that can be described as semi-molten or expandable with a plastic memory. This state of the plastic pipe is characterized by a temperature below the melting point in the case of crystalline plastic materials but not so far below the melting point that the material cannot be expanded and shrunk. The plastic pipe, when expanded and allowed to shrink, will return toward its original diameter which it had prior to expansion.

The cooling of the shrinking plastic pipe causes a rapid ending of the shrinking process. The cooling is normally carried out by spraying a cooling fluid onto the outside surface of the shrinking pipe. By locating the point of impact of the cooling fluid at different locations axially, the diameter of the pipe can be controlled. Another possibility to quench the pipe is to pass the shrinking pipe through a gasket into a cooling tank wherein the pipe is submersed in the cooling fluid (e.g., water) to prevent further shrinking.

Another embodiment of this invention is an apparatus for producing the plastic pipe. This apparatus comprises an extruder having a bushing and an internal mandrel allowing the extrusion of the plastic pipe. This extruder is a conventional piece of equipment. Connected to the internal mandrel, an external expanding mandrel is provided for. This external expanding mandrel has a diameter which in axial direction of the movement of the pipe continuously increases to a maximum value significantly above the internal diameter of the bushing of the extruder. Then the diameter of the external expanding mandrel continuously decreases. The apparatus is provided with cooling means to cool the pipe having moved past the maximum value diameter described. The cooling of the pipe is controllable and adjustable so that the outside diameter of the pipe formed can be chosen within a given range. Preferably, the external mandrel comprises two coaxial frustoconical sections having the major basis of the same diameter and being connected with each other at their major basis which also represents the maximum value diameter of the expanding mandrel. For a smooth operation, the external mandrel is connected with the internal mandrel to form a smooth and flush connection for the extruded pipe to move along on.

The external mandrel is preferably made out of metal, such as brass. The half angle of both of the frustoconically shaped surfaces of the external mandrel will generally be in the range of about 10° to 15°. The axial length L of the frustoconical section crossing the expansion of the pipe is related to the radius R of the minor base of the respective frustoconical section and the half angle x of the frustoconical section by the relationship $$0.2 \leq (L \tan x)R \leq 0.8$$

The radius of the minor basis of the other fructoconical section is generally equal to or larger than R, the radius of the minor basis of the one frustoconial section.

The drawing shows a partial cross-sectional view of the apparatus of this invention.

An extruder head 1 of an extruder 2 is provided with an internal mandrel 3 and a bushing 4. The annular opening between the bushing 4 and the internal mandrel 3 forms the pipe shaping orifice of the extruder.

The internal mandrel 3 is cooled by a cooling fluid circulated through the channels 5 of a cooling insert 6. The bushing 4 is cooled by a cooling liquid circulated through cooling channels 7 in the bushing 4.

For further details of the extruder and extruder head so far described, reference is made to the U.S. Pat. No. 3,393,427, the disclosure of which is hereby incorporated by reference.

In accordance with this invention, an external mandrel or expansion element 8 is connected to the cooling insert 6 of the internal mandrel 3 by bolts 38. The external mandrel 8 consists of two frustoconical sections 81 and 82. These frustoconical sections 81 and 82 are shown in the drawing to be essentially of the same size but it is within the scope of this invention to use an expanding mandrel where the two frustoconical sections 81 and 82 are of different sizes, both with respect to their axial length and with respect to their pernicity. The expanding mandrel 8 is provided with a large cylindrical cavity 83. The function of this cavity is both to reduce the weight of the expansion mandrel and to prevent too rapid a cooling of the plastic pipe 9 while being in contact with the expansion mandrel 8. The two frustoconical sections 81 and 82 can be separate pieces joined together by threads 75 to permit interchangeability of sections with different dimensions.

Essentially liquid plastic materials, such as ultra-high molecular weight polyethylene 91, enters the extrusion head 1. Plastic pipe 9 which is in the semi-molten state described above leaves the orifice of the extrusion head 1 and is expanded along the expansion cone 81 of the external mandrel 8. At the line 84 which is the common greater base of the frustoconical sections 81 and 82 of the external mandrel, the plastic pipe 9 has been expanded to its largest diameter. During the further movement of the plastic pipe along the shrink cone 82, the plastic pipe 9 shrinks. The shrinking plastic pipe 9 is then rapidly cooled by means of a quench fluid sprayed onto the hot plastic pipe from quench nozzles 10. These quench nozzles 10 can be positioned at axially different locations as indicated by the arrows connected to the schematic representation of the spray nozzles 10. Ring-like gasket 50 adjacent the nozzles 10 acts as a barrier to the cascading coolant (e.g., water) from the nozzles 10 and defines the point at which the shrinkage essentially ceases to form the pipe into its final diameter 60.

By changing the axial position of the spray nozzles 10, the outside diameter of the plastic pipe 9 formed can be controlled.

The plastic pipes formed in accordance with the process of this invention are useful in many application. One of the more significant applications for such pipes having a diameter specified by the customer is the use of these tubings as liners for steel pipe. Therefore, a preferred range of wall thicknesses for the plastic pipes here contemplated is 0.125 to 0.5 inches.

A specific example in the following is intended to further illustrate this invention but not to limit the scope thereof unduly.

EXAMPLE

In an apparatus, as shown schematically in the drawing, plastic pipe was produced from an high density ethylene-hexene-copolymer Marlex M-7000 ® manufactured by Phillips Petroleum Company, Bartlesville, Okla., which is a high density polyethylene having a density of 0.955 g/cc determined in accordance with ASTM D-1505 and having an HLMI of 1.5 g/10 min. (ASTM D-1238, condition F). The external diameter of the extrusion orifice was 7.229 inches. The semi-molten pipe with a wall thickness of 0.219 inches was expanded to a maximum external diameter of 8.675 inches. The shrinking pipe was then cooled by a water spray and the resulting pipe had an outside diameter of 7.900 inches with a nominal wall thickness of 0.215 inches. By changing the position of the water spray, it was possible to produce plastic pipe having a range of external diameters of 7.500 to 8.295 inches. Mechanical tests of the pipes so produced showed that it was possible to produce these pipes of controlled external diameter with mechanical properties well within customers specifications.

Reasonable variations and modifications which will become apparent to those skilled in the art can be made from this invention without departing from the spirit and scope thereof.

We claim:

1. A process to produce a plastic pipe having an external diameter that can be selected within a range of external diameters using an extruder with one and the same die opening for any diameter within said range, said process comprising:
   (a) extruding a plastic pipe through said die opening of said extruder formed between a bushing and an internal mandrel,
   (b) guiding the so extruded semi-molten pipe over an external expanding mandrel having in the direction of the pipe movement a first section of continuously increasing cross-section and followed by a second section of continuously decreasing cross-section, (c) allowing the so expanded pipe to shrink, (d) cooling the expanded and shrinking pipe at a preselected axial location within a range of axial cooling locations to effectively stop said shrinking, said range of cooling locations corresponding to said range of external diameters of said pipe.

2. A process in accordance with claim 1 comprising:
(a) cooling said expanded and shrinking pipe for a first period of time at a first location to obtain a pipe having a first diameter,
(b) thereafter changing said axial cooling location and cooling said expanded and shrinking pipe at a second location for a second period of time to obtain a pipe of significantly different diameter compared to the pipe produced during said first period of time,
with the proviso that in order to produce a pipe of larger external diameter during said second period of time as compared to said first period of time, said second axial location is upstream of said first axial location and for the production of a pipe of smaller diameter during the second period of time said second axial location is downstream of said first axial location of cooling.

3. A process in accordance with claim 1 wherein said plastic material is selected from the group consisting of polyethylene and copolymers of ethylene and a minor quantity of mono-olefin comonomers having 4 to 8 carbon atoms.

4. An apparatus for producing plastic pipe comprising:
(a) an extruder having a bushing and an internal mandrel together forming a ring-shaped extruder orifice,
(b) connected to said extruder and coaxial with said internal mandrel an external expanding mandrel having a diameter which, in axial direction of the movement of the pipe continuously increases to a maximum value significantly above the internal diameter of said bushing and then continuously decreasing,
(c) a cooling means to cool pipe having moved past said maximum value diameter of said external mandrel, said cooling being controllable and adjustable in order to control the outside diameter of the pipe formed.

5. An apparatus in accordance with claim 4 wherein said external mandrel comprises two coaxial frustoconical sections having a major basis of the same diameter which is said maximum value diameter, and said frustoconical sections being connected with each other at their major base.

6. An apparatus in accordance with claim 4 wherein said cooling means comprises:
a ring gasket arranged coaxially with and contacting the pipe surface in the area of the expanding mandrel of decreasing diameter, and
spray nozzles arranged around said expanding mandrel and pipe permitting cooling fluid to be sprayed onto the pipe downstream of said gasket and building a cooling fluid mass on said pipe, said mass having said gasket as the upstream limitation.

7. An apparatus in accordance with claim 6 wherein the axial position of said gasket and of a plurality of spray nozzles to spray cooling fluid onto the surface of the pipe with respect to said external mandrel can be adjusted for adjusting the outside diameter of the pipe.

8. An apparatus in accordance with claim 4 wherein said external mandrel and said internal mandrel form a smooth and flush connection.

9. An apparatus in accordance with claim 4 wherein said external mandrel is made from brass metal.

10. An apparatus in accordance with claim 4 or 5 wherein the maximum ratio of the value of the diameter of said external mandrel to the diameter of said extruder internal mandrel is in range of about 1.2 to 1.8.

11. A process in accordance with claim 1 wherein said expansion of said expandable pipe is carried out by moving said hot pipe from the die opening of an extruder past an external mandrel having the shape of two smooth coaxial frustoconical surfaces having identical major bases and connected at said major bases to form a surface of, in axial direction, continuously increasing diameter to a maximum diameter being that of said major bases and thereafter continuously decreasing diameter, the cone half-angle of both said frustoconical surfaces being in the range of about 10° to about 15°.

* * * * *